(12) United States Patent
Zhang et al.

(10) Patent No.: US 12,434,601 B2
(45) Date of Patent: Oct. 7, 2025

(54) SEAT FIVE-LINK STRUCTURE

(71) Applicant: YANFENG INTERNATIONAL AUTOMOTIVE TECHNOLOGY CO., LTD., Shanghai (CN)

(72) Inventors: Wu Zhang, Shanghai (CN); Tingyong Cai, Shanghai (CN); Xiaohan Jiang, Shanghai (CN); Yueyun Chen, Shanghai (CN); Xun Tang, Shanghai (CN)

(73) Assignee: YANFENG INTERNATIONAL AUTOMOTIVE TECHNOLOGY CO., LTD., Shanghai (CN)

( * ) Notice: Subject to any disclaimer, the term of this patent is extended or adjusted under 35 U.S.C. 154(b) by 94 days.

(21) Appl. No.: 18/283,800

(22) PCT Filed: Mar. 8, 2022

(86) PCT No.: PCT/CN2022/079673
§ 371 (c)(1),
(2) Date: Sep. 23, 2023

(87) PCT Pub. No.: WO2022/257512
PCT Pub. Date: Dec. 15, 2022

(65) Prior Publication Data
US 2024/0198867 A1    Jun. 20, 2024

(30) Foreign Application Priority Data
Jun. 10, 2021    (CN) .................. 202110648638.6

(51) Int. Cl.
*B60N 2/18*    (2006.01)
*B60N 2/02*    (2006.01)
(Continued)

(52) U.S. Cl.
CPC ......... *B60N 2/181* (2013.01); *B60N 2/02258* (2023.08); *B60N 2/10* (2013.01); *B60N 2/161* (2013.01)

(58) Field of Classification Search
CPC ...... B60N 2/181; B60N 2/02258; B60N 2/10; B60N 2/161; B60N 2/02253; B60N 2/02246
See application file for complete search history.

(56) References Cited

U.S. PATENT DOCUMENTS

| 4,368,916 A | 1/1983 | Blasin |
| 10,773,613 B2 | 9/2020 | Nakamura et al. |

(Continued)

FOREIGN PATENT DOCUMENTS

| CN | 103264645 A | 8/2013 |
| CN | 104442472 B | 8/2016 |

(Continued)

OTHER PUBLICATIONS

International Search Report and Written Opinion from corresponding International Application No. PCT/CN2022/079673, mailed on Oct. 14, 2022, 11 pages with translation.

(Continued)

*Primary Examiner* — Jonathan Liu
(74) *Attorney, Agent, or Firm* — Tucker Ellis LLP (57) ABSTRACT

The present invention relates to a seat five-link structure (A), comprising a bottom support (1), a wall plate (3), a first front link (4), a second front link (5) and a rear link (2), wherein the bottom support (1) is pivotally connected with the first front link (4) through a first pivot axis ($O_1$), the first front link (4) is pivotally connected with the second front link (5), the second front link (5) is pivotally connected with the wall plate (3), and the rear link (2) is pivotally connected with the bottom support (1) through a second pivot axis ($O_2$) and is (Continued)

pivotally connected with the wall plate (3); a first electric motor (8) configured to output a first external force for driving the first front link (4) to rotate around the first pivot axis ($O_1$); and a second electric motor (12) configured to output a second external force for driving the rear link (12) to rotate around the second pivot axis ($O_2$). The seat five-link structure (A) according to the present invention may have a larger adjustment range of an inclination angle and a seat height, which is beneficial to the realization of a zero-gravity function and allows an occupant better vision and better comfort.

17 Claims, 13 Drawing Sheets

(51) Int. Cl.
*B60N 2/10* (2006.01)
*B60N 2/16* (2006.01)

(56) References Cited

U.S. PATENT DOCUMENTS

| | | |
|---|---|---|
| 2010/0102586 A1 | 4/2010 | Jungert |
| 2013/0161989 A1* | 6/2013 | Ito .................... B60N 2/181 297/344.15 |
| 2017/0210246 A1* | 7/2017 | Kubota ............... B60N 2/0244 |
| 2018/0194249 A1 | 7/2018 | Schueler |
| 2019/0152351 A1 | 5/2019 | Murakami et al. |
| 2022/0363166 A1 | 11/2022 | Zhang |

FOREIGN PATENT DOCUMENTS

| | | |
|---|---|---|
| CN | 206049420 U | 3/2017 |
| CN | 207028925 U | 2/2018 |
| CN | 107848448 A | 3/2018 |
| CN | 109094438 A | 12/2018 |
| CN | 109353254 A | 2/2019 |
| CN | 111746361 A | 10/2020 |
| CN | 112297972 A | 2/2021 |
| CN | 212827982 U | 3/2021 |
| EP | 0022691 A1 | 1/1981 |
| JP | 2009029185 A | 2/2009 |
| JP | 2018016258 A | 2/2018 |
| KR | 101326492 B1 | 11/2013 |
| KR | 102235731 B1 | 4/2021 |
| WO | 2012036212 A1 | 3/2012 |

OTHER PUBLICATIONS

First Office Action from corresponding Chinese Application No. 202110648638.6, mailed on Dec. 21, 2021, 16 pages with translation.

Second Office Action from corresponding Chinese Application No. 202110648638.6, mailed on Mar. 28, 2022, 13 pages with translation.

Extended European Search Report from corresponding Application No. 22819117.7 mailed on May 20, 2025, 111 pages.

* cited by examiner

SEAT FIVE-LINK STRUCTURE

TECHNICAL FIELD

The present invention relates to a vehicle seat, in particular relates to a seat five-link structure.

BACKGROUND OF INVENTION

CN111746361A has disclosed a vehicle seat with a three-link structure, wherein a seat cushion is adjustable only with respect to its angle, and isn't adjustable with respect to its overall height, wherein an adjustment range is limited. CN110435506A and CN104442472B have disclosed vehicle seats with a four-link structure, wherein an adjustment angle range of a seat cushion is only 0-6°, wherein the knees and the heart of an occupant can't reach the same level, and an adjustment range for a zero-gravity status is limited.

At present, an adjustment range of an inclination angle of vehicle seats in the market is generally less than 4°, that is to say, an inclination angle range is only 0-4°. If the inclination angle is too small, the knees can't reach the same level as the heart, and thus a comfort angle for a zero-gravity state can't be realized, and thus an occupant can't reach a comfortable and relaxed state. In addition, at present, a height lifting range of seats on the market is generally lower than 65 mm, for example, a height adjustment range is only 0-55.1 mm. The seat height adjustment is limited, a limit number of seat states may be provided to an occupant, and the field of vision of the occupant is also limited.

SUMMARY OF INVENTION

An object of the present invention is to provide a seat five-link structure, wherein the problem that seats in the prior art can't realize an ideal zero-gravity state is resolved.

The object of the present invention may be achieved by a seat five-link structure, which comprises:
 a bottom support, a wall plate, a first front link, a second front link and a rear link, wherein the bottom support is pivotally connected with the first front link through a first pivot axis, the first front link is pivotally connected with the second front link, the second front link is pivotally connected with the wall plate, and the rear link is pivotally connected with the bottom support through a second pivot axis and is pivotally connected with the wall plate;
 a first electric motor configured to output a first external force for driving the first front link to rotate around the first pivot axis; and
 a second electric motor configured to output a second external force for driving the rear link to rotate around the second pivot axis.

Preferably, a front end of the bottom support is pivotally connected with a first end of the first front link, and/or a second end of the first front link is pivotally connected with a first end of the second front link, and/or a second end of the second front link is pivotally connected with a front end of the wall plate, and/or a rear end of the bottom support is pivotally connected with a first end of the rear link, and/or a second end of the rear link is pivotally connected with a rear end of the wall plate.

Preferably, the first front link is an inner front link, and the second front link is an outer front link.

In an embodiment, the seat five-link structure according to the present invention comprises a bottom support, a rear link, a wall plate, an outer front link, an inner front link, a first electric motor and a second electric motor, wherein two ends of the bottom support are respectively pivotally connected with the inner front link and the rear link through a first pivot axis and a second pivot axis; two ends of the rear link are respectively pivotally connected with the bottom support and the wall plate; two ends of the wall plate are respectively pivotally connected with the rear link and the outer front link; and two ends of the outer front link are respectively pivotally connected with the wall plate and the inner front link, and two ends of the inner front link are respectively pivotally connected with the outer front link and the bottom support, wherein the first electric motor can provide a first external force, wherein the inner front link rotates around the first pivot axis in a first direction under the action of the first external force, and wherein the second electric motor can provide a second external force, wherein the rear link rotates around the second pivot axis in a second direction opposite to the first direction under the action of the second external force.

Preferably, the seat five-link structure further comprises an angle adjuster and a star-shaped rod, wherein the inner front link is rotatably mounted to the bottom support through the angle adjuster, and the star-shaped rod extending through the angle adjuster is driven by the first electric motor.

Preferably, the seat five-link structure further comprises an angle adjuster, wherein the first front link is rotatably mounted to the bottom support through the angle adjuster.

Preferably, the seat five-link structure further comprises a star-shaped rod which extends through and cooperates with the angle adjuster, wherein the star-shaped rod is drivable by the first electric motor, wherein an axis of the star-shaped rod defines the first pivot axis.

As an equivalent of the star-shaped rod, a rod with a non-circular cross section may be adopted, wherein another component can be rotation-fixedly mounted to the rod.

Preferably, an axis of the star-shaped rod defines the first pivot axis.

Preferably, the seat five-link structure further comprises a rack, wherein the second electric motor can drive the rear link through the rack.

Preferably, the second electric motor is fixedly mounted to the wall plate and engages with the rack through its pinion.

Preferably, the rack is supported on the wall plate through a rack bushing and is pivotally connected with the rear link.

Preferably, a first rivet defines the second pivot axis.

Preferably, the seat five-link structure has an initial position, in which the rack extends substantially in an extension direction of the wall plate.

Preferably, the seat five-link structure further comprises a rear pipe fixed to the rear link, wherein a pivotal connection between the rear link and the wall plate is defined by the rear pipe.

Preferably, a pivotal connection between the outer front link and the wall plate is defined by a second rivet.

Preferably, a pivotal connection between the outer front link and the inner front link is defined by a third rivet.

In an embodiment, the seat five-link structure comprises a left and a right structural group spaced apart from each other, wherein the left structural group comprises a left bottom support, a left wall plate, a left first front link, a left second front link and a left rear link, and wherein the right structural group comprises a right bottom support, a right wall plate, a right first front link and a right second front link and a right rear link.

In an embodiment, the seat five-link structure further comprises a left or a right angle adjuster and a star-shaped rod, wherein the left first front link is rotatably mounted to the left bottom support through the left angle adjuster, or wherein the right first front link is rotatably mounted to the right bottom support through the right angle adjuster, wherein the star-shaped rod extends through and cooperates with the left or the right angle adjuster, wherein the star-shaped rod is drivable by the first electric motor, wherein an axis of the star-shaped rod defines the first pivot axis. In this embodiment, only one of the two first front links may be provided with the associated angle adjuster.

In an embodiment, the seat five-link structure further comprises a left and a right angle adjuster and a star-shaped rod, wherein the left first front link is rotatably mounted to the left bottom support through the left angle adjuster, and the right first front link is rotatably mounted to the right bottom support through the right angle adjuster, wherein the star-shaped rod extends through and cooperates with the two angle adjusters, wherein the star-shaped rod is drivable by the first electric motor, wherein an axis of the star-shaped rod defines the first pivot axis.

In an embodiment, the seat five-link structure comprises:
a left second electric motor, which is fixedly mounted to the left wall plate,
a left rack, which engages with a pinion of the left second electric motor and is pivotally connected with the left rear link, and
a left rack bushing, which is mounted to the left wall plate and supports the left rack.

In an embodiment, the seat five-link structure comprises:
a right second electric motor, which is fixedly mounted to the right wall plate,
a right rack, which engages a pinion of the right second electric motor and is pivotally connected with the right rear link, and
a right rack bushing, which is mounted to the right wall plate and supports the right rack.

In an embodiment, the left rear link and the right rear link are fixed to a rear pipe, wherein a pivotal connection between the left rear link and the left wall plate and a pivotal connection between the right rear link and the right wall plate are defined by the rear pipe, wherein the left wall plate and the right wall plate are rotatably mounted to the rear pipe.

In an embodiment, starting from an initial position, in the case where the first electric motor operates and the second electric motor doesn't operate, the first front link is rotatable around the first pivot axis in a first direction under the action of the first external force, so as to lift a front side of the seat five-link structure and thus adjust an inclination angle of the wall plate.

In an embodiment, starting from an initial position, in the case where the first electric motor doesn't operate and the second electric motor operates, the rear link is rotatable around the second pivot axis in a second direction opposite to the first direction under the action of the second external force, so as to lift a rear side of the seat five-link structure, wherein the wall plate is lifted up, while an inclination angle of the wall plate keeps unchanged.

In some embodiments, the seat five-link structure according to the present invention has a larger adjustment range for the inclination angle and the seat height. For example, in the condition of the same link lengths, the adjustment range of the inclination angle of the seat five-link structure may be 0-22.5°, and the height adjustment range may be 0-100 mm. The broad adjustment range of the inclination angle is beneficial to the realization of a zero-gravity function, and the broad height adjustment range allows the occupant better vision and better comfort. Moreover, in the condition of the comfort and the spatial arrangement, a vehicle seat equipped with the seat five-link structure according to the present invention can reach both a standard of a seat equipped with an integrated safety belt (ABTS) and a strength standard of a four-link seat, wherein there aren't problems in the prior art that a non-ABTS safety belt is fixed to a vehicle body, a movement space for the seat adjustment is limited, the seat occupies a portion of a layout space in the vehicle body, and the strength is limited. In addition, in the condition of the same material and the same link lengths, a vehicle seat equipped with the seat five-link structure according to the present invention may have a clearance of 183 mm to the ground of the vehicle body in its lowest locking position, while such a clearance in the prior art is greater than 200 mm. Obviously, the low locking position according to the present invention is more suitable for the installation of a vehicle seat in a new energy vehicle and conforms to the future trend of development.

DETAILED DESCRIPTION OF DRAWINGS

Preferable embodiments according to the present invention are described in detail with reference to the accompanying drawings.

In the description, terms with respect to the position and the orientation, such as front, rear, up, down, top, bottom, inside and outside, are related to a perspective of an occupant in a normal sitting state in a vehicle seat, wherein the vehicle seat is generally oriented in a driving direction of a vehicle. Alternatively, the vehicle seat may also be oriented transversely to the driving direction. Thus, the terms with respect to the position and the orientation are directed to the purpose of disclosure of the invention, and aren't intended to restrict the invention.

Figure 1A:
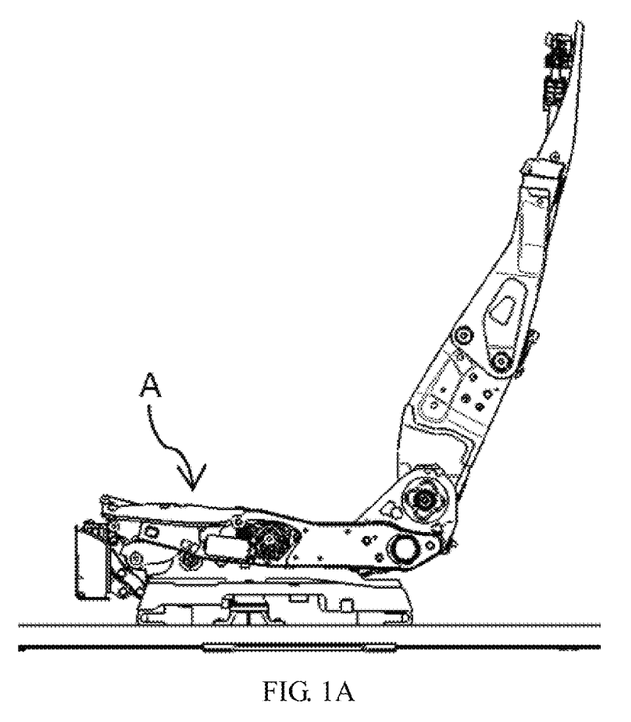
FIG. 1A shows a vehicle seat equipped with a seat five-link structure according to a preferable embodiment of the present invention in a driving state.
Figure 1B:
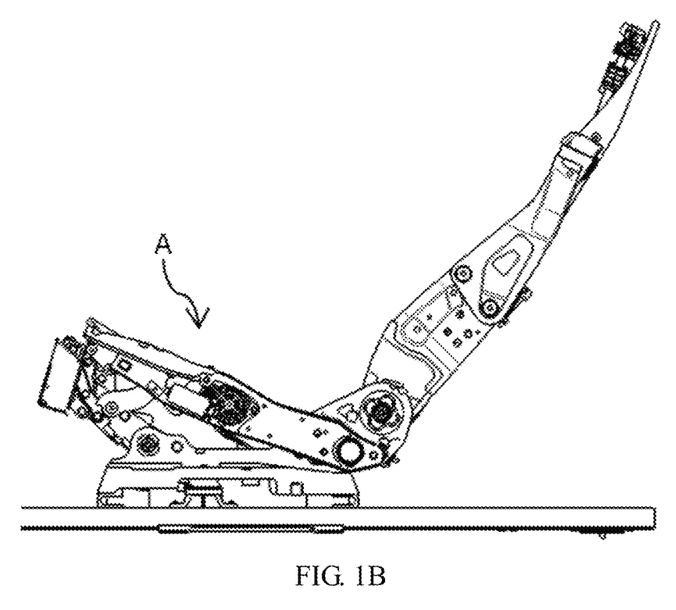
FIG. 1B shows a vehicle seat equipped with a seat five-link structure according to a preferable embodiment of the present invention in a working state.
Figure 1C:
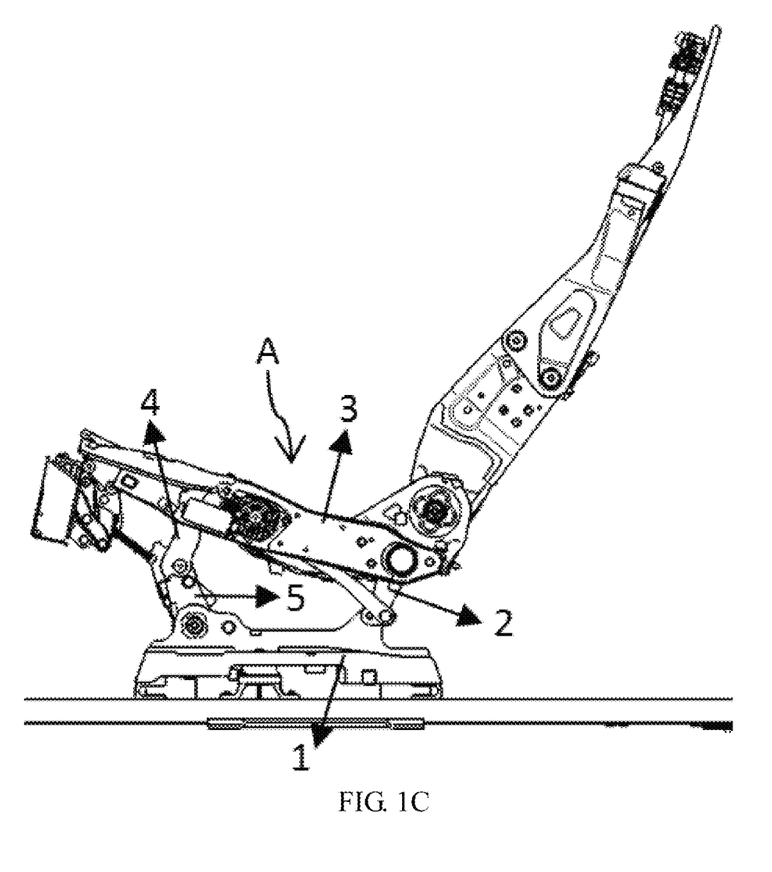
FIG. 1C shows a vehicle seat equipped with a seat five-link structure according to a preferable embodiment of the present invention in a rest state.

FIGS. 1A-1C show a driving state, a working state and a rest state of a vehicle seat equipped with a seat five-link structure A according to a preferable embodiment of the present invention, which correspond to an initial position, a front lifting position, and a front and rear lifting position of the seat five-link structure A, respectively. As shown in FIG. 1C, the seat five-link structure A comprises a bottom support 1, a rear link 2, a wall plate 3, an outer front link 4 and an inner front link 5, wherein two ends of the bottom support 1 are respectively pivotally connected with a lower end of the rear link 2 and a lower end of the wall plate 3, and two ends of the wall plate 3 are respectively pivotally connected with an upper end of the rear link 2 an upper end of the outer front link 4, and two ends of the outer front link 4 are respectively pivotally connected with a front end of the wall plate 3 and a front end of the inner front link 5, and two ends of the inner front link 5 are respectively pivotally connected with a front end of the outer front link 4 and a front end of the wall plate 3.

Figure 2:
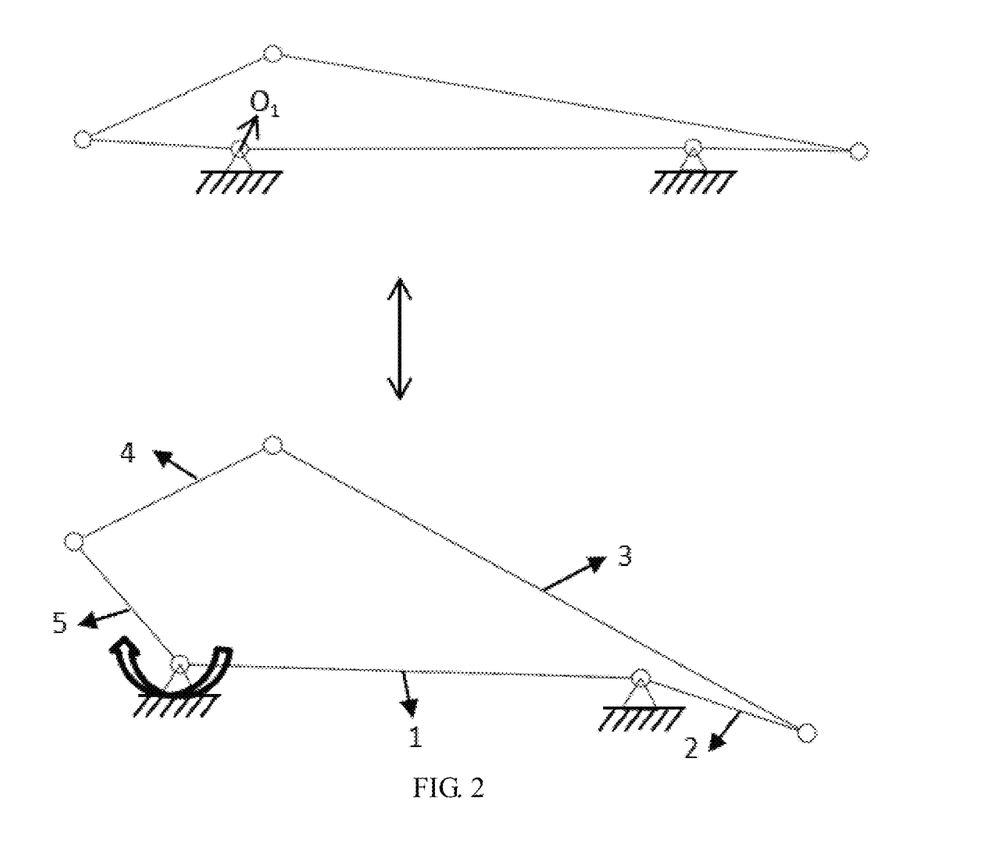
FIG. 2 is a schematic kinematic diagram of the seat five-link structure of FIGS. 1A-1C, which moves from an initial position to a front lifting position.

FIG. 2 is a schematic kinematic diagram of the seat five-link structure A, which moves from an initial position to a front lifting position, wherein the inner front link 5 rotates clockwise around a first pivot axis $O_1$ under the action of a first external force, so that a front side of the seat five-link structure A is lifted up, and thus the working state of the vehicle seat corresponding to FIG. 1B is achieved.

Figure 3:
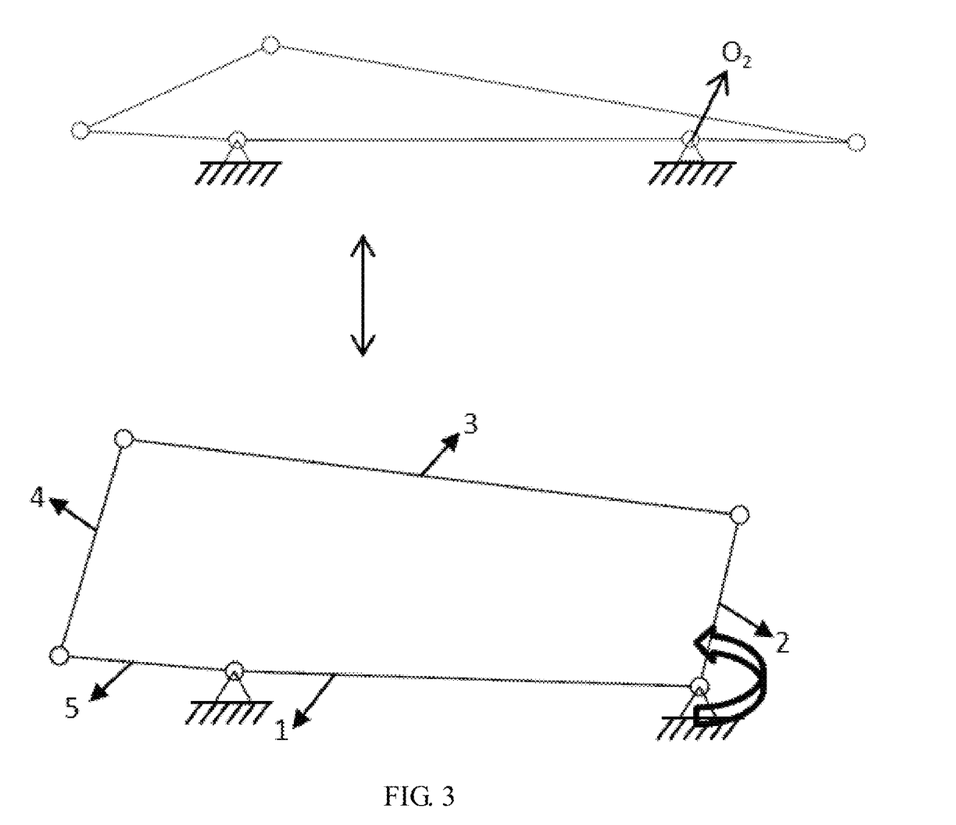
FIG. 3 is a schematic kinematic diagram of the seat five-link structure of FIGS. 1A-1C, which moves from an initial position to a rear lifting position.

FIG. 3 is a schematic kinematic diagram of the seat five-link structure A, which moves from an initial position to a rear lifting position, wherein the rear link 2 rotates counterclockwise around a second pivot axis $O_2$ under the action of a second external force, so that a rear side of the seat five-link structure A is lifted up.

Figure 4:
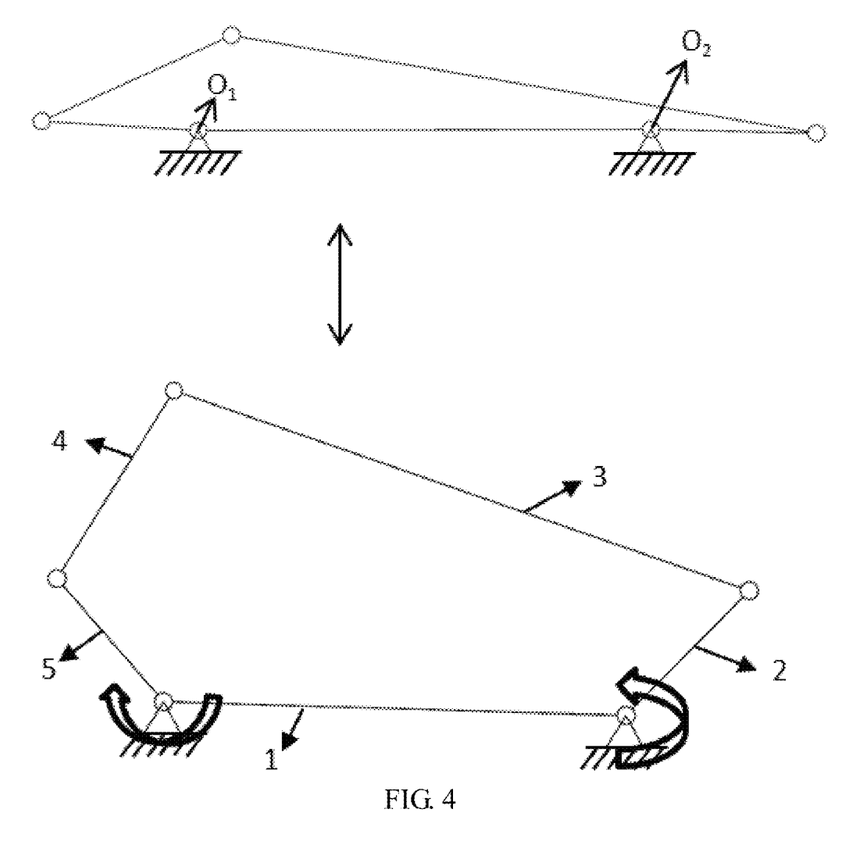
FIG. 4 is a schematic kinematic diagram of the seat five-link structure of FIGS. 1A-1C, which moves from an initial position to a front and rear lifting position.

FIG. 4 is a schematic kinematic diagram of the seat five-link structure A, which moves from an initial position to a front and rear lifting position, wherein the inner front link 5 rotates clockwise around the first pivot axis $O_1$ under the action of the first external force, and meanwhile, the rear link 2 rotates counterclockwise around the second pivot axis $O_2$ under the action of the second external force, so that the seat five-link structure A is lifted up both in the front side and in the rear side, and thus the rest state of the vehicle seat corresponding to FIG. 1C is achieved.

Figure 5:
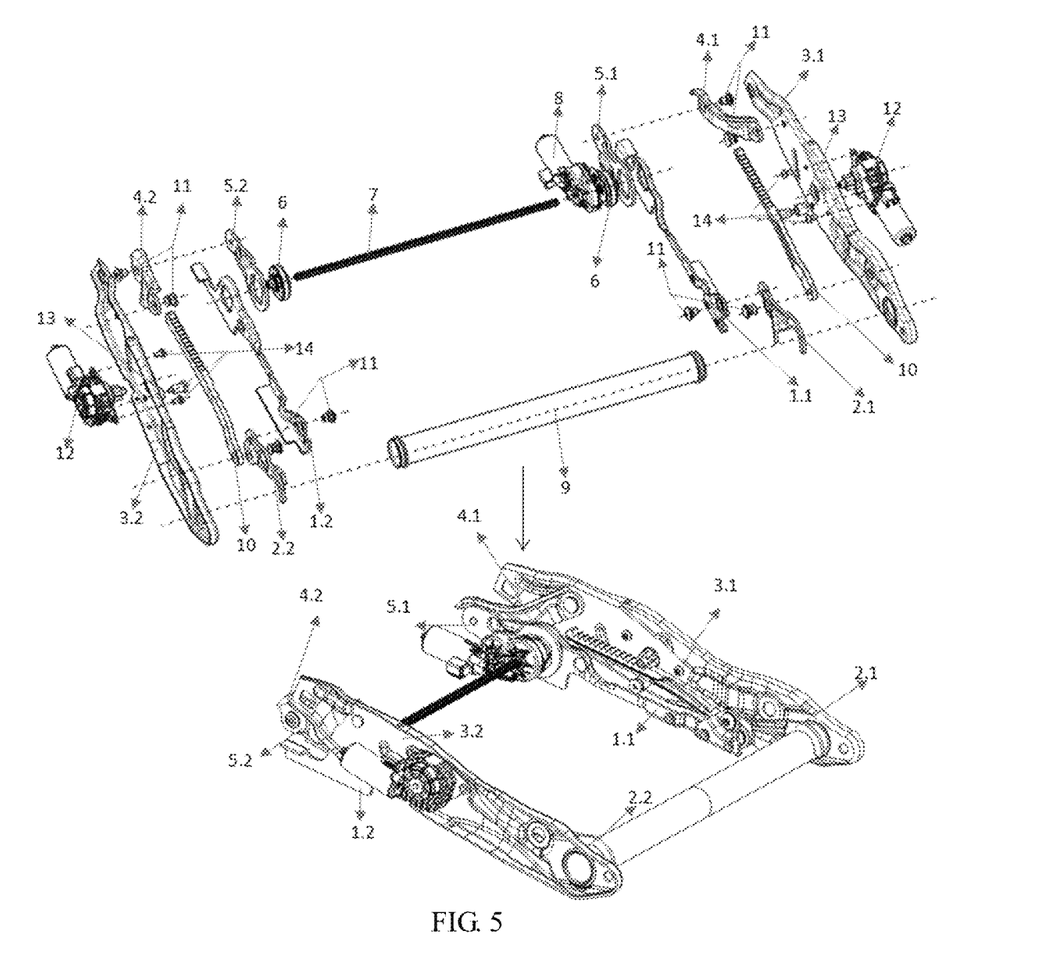
FIG. 5 is a schematic view illustrating an overall assembly of the seat five-link structure of FIGS. 1A-1C.

With reference to FIG. 5, the bottom support 1 of the seat five-link structure A comprises a right bottom support 1.1 and a left bottom support 1.2 spaced apart from each other, the rear link 2 comprises a right rear link 2.1 and a left rear link 2.2 spaced apart from each other, the wall plate 3 comprises a right wall plate 3.1 and a left wall plate 3.2 spaced apart from each other, the outer front link 4 comprises a right outer front link 4.1 and a left outer front link 4.2 spaced apart from each other, and the inner front link 5 comprises a right inner front link 5.1 and a left front link 5.2 spaced apart from each other.

Figure 6:
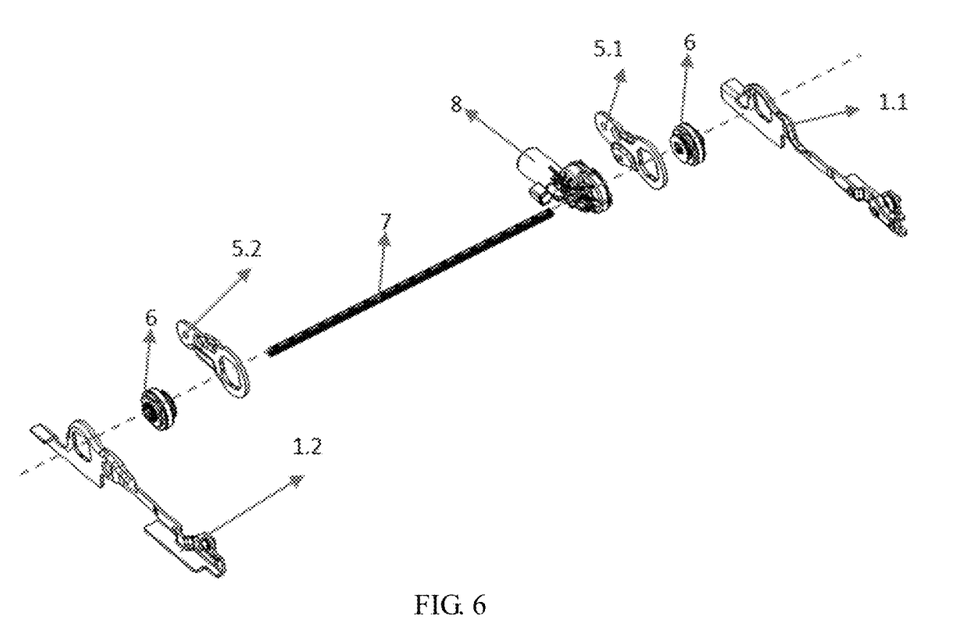
FIG. 6 shows an assembly between a bottom support and an inner front link of the seat five-link structure of FIG. 5.

FIG. 6 shows an assembly between the bottom support 1 of the seat five-link structure A and the inner front link. With reference to FIG. 5, the seat five-link structure A further comprises two angle adjusters 6, a star-shaped rod 7 and a first electric motor 8, wherein the right inner front link 5.1 is rotatably mounted to a front end of the right bottom support 1.1 through one of the angle adjusters 6, and the left inner front link 5.2 is rotatably mounted to a front end of the left bottom support 1.2 through the other angle adjuster 6, and the star-shaped rod 7 extends through and cooperate with the two angle adjusters and is driven by the first electric motor 8. An axis of the star-shaped rod 7 defines the first pivotal axis $O_1$, and the first electric motor 8 can output the first external force, so that the inner front link can be driven to rotate by the first electric motor 8.

Figure 7:
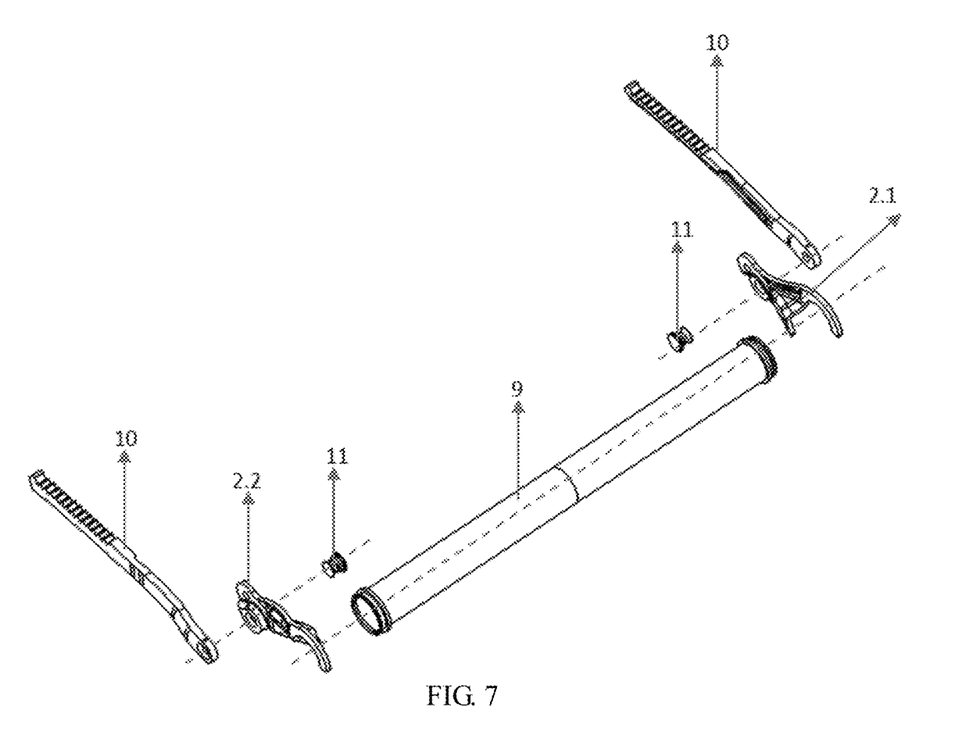
FIG. 7 shows an assembly of a rear link of the seat five-link structure of FIG. 5.

FIG. 7 shows an assembly of the rear link of the seat five-link structure A. With reference to FIG. 7, the seat five-link structure A further comprises a rear pipe 9 and two racks 10, wherein rear ends of the right rear link 2.1 and the left rear link 2.2 are fixed to two opposite ends of the rear pipe 9, for example by welding, and wherein the two racks 10 are rotatably mounted to respective front ends of the right rear link 2.1 and the left rear link 2.2 through rivets 11.

Figure 8:
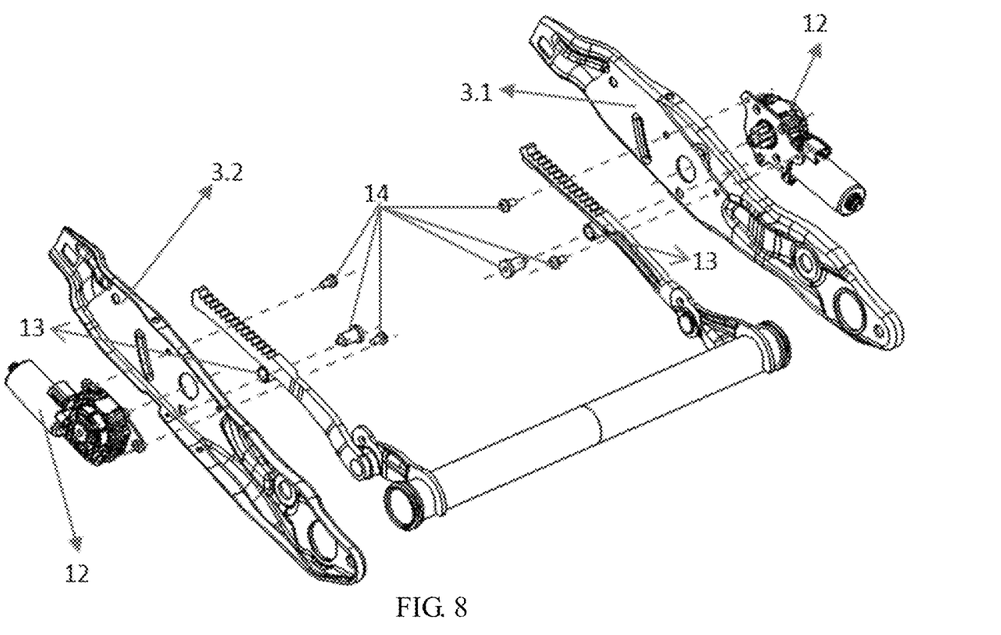
FIG. 8 shows an assembly between a rear link and a wall plate of the seat five-link structure of FIG. 5.

FIG. 8 shows an assembly between the rear link and the wall plate of the seat five-link structure A. With reference to FIG. 8, the seat five-link structure A further comprises two second electric motors 12 and two rack bushings 13, wherein the right wall plate 3.1 and the left wall plate 3.2 are rotatably mounted to the two opposite ends of the rear pipe 9, so that the pivotal connections between the rear links and the wall plate are defined by the rear pipe 9. The two electric motors 12 are fixedly mounted to a respective outer side of the right wall plate 3.1 and the left wall plate 3.2 through two respective screws 14. The two rack bushings 13 are fixedly mounted to a respective inner side of the right wall plate 3.1 and the left wall plate 3.2 by another respective screw 14. The two racks 10 cooperate with pinions of the second electric motors 12 penetrating the wall plates 3.1 and 3.2 above the rack bushings 13. The second electric motors 12 can provide the above-mentioned second external force, so that the rear links 2 can be driven to rotate by means of the racks 10 through the second electric motors 12.

Figure 9:
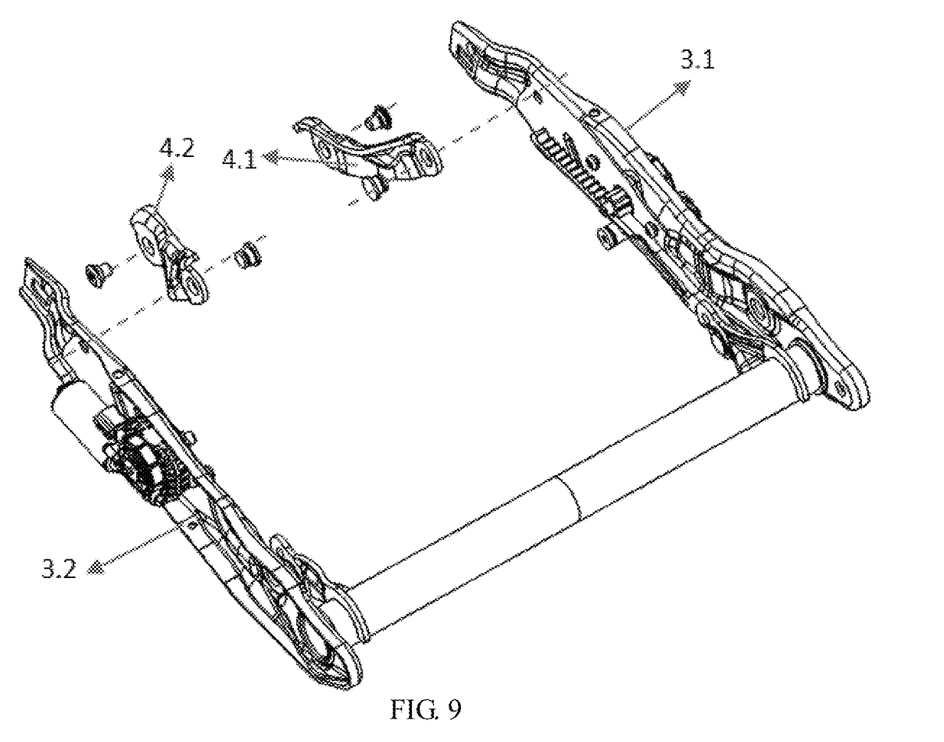
FIG. 9 shows an assembly between a wall plate and an outer front link of the seat five-link structure of FIG. 5.

FIG. 9 shows an assembly between the wall plate and the outer front link of the seat five-link structure A, wherein the right outer front link 4.1 is rotatably mounted to a front end of the right wall plate 3.1 through a rivet 11, and wherein the left outer front link 4.2 is rotatably mounted to a front end of the left wall plate 3.2 through another rivet 11, so that the two rivets 11 jointly define the pivotal connections between the wall plates and the outer front links.

Figure 10:
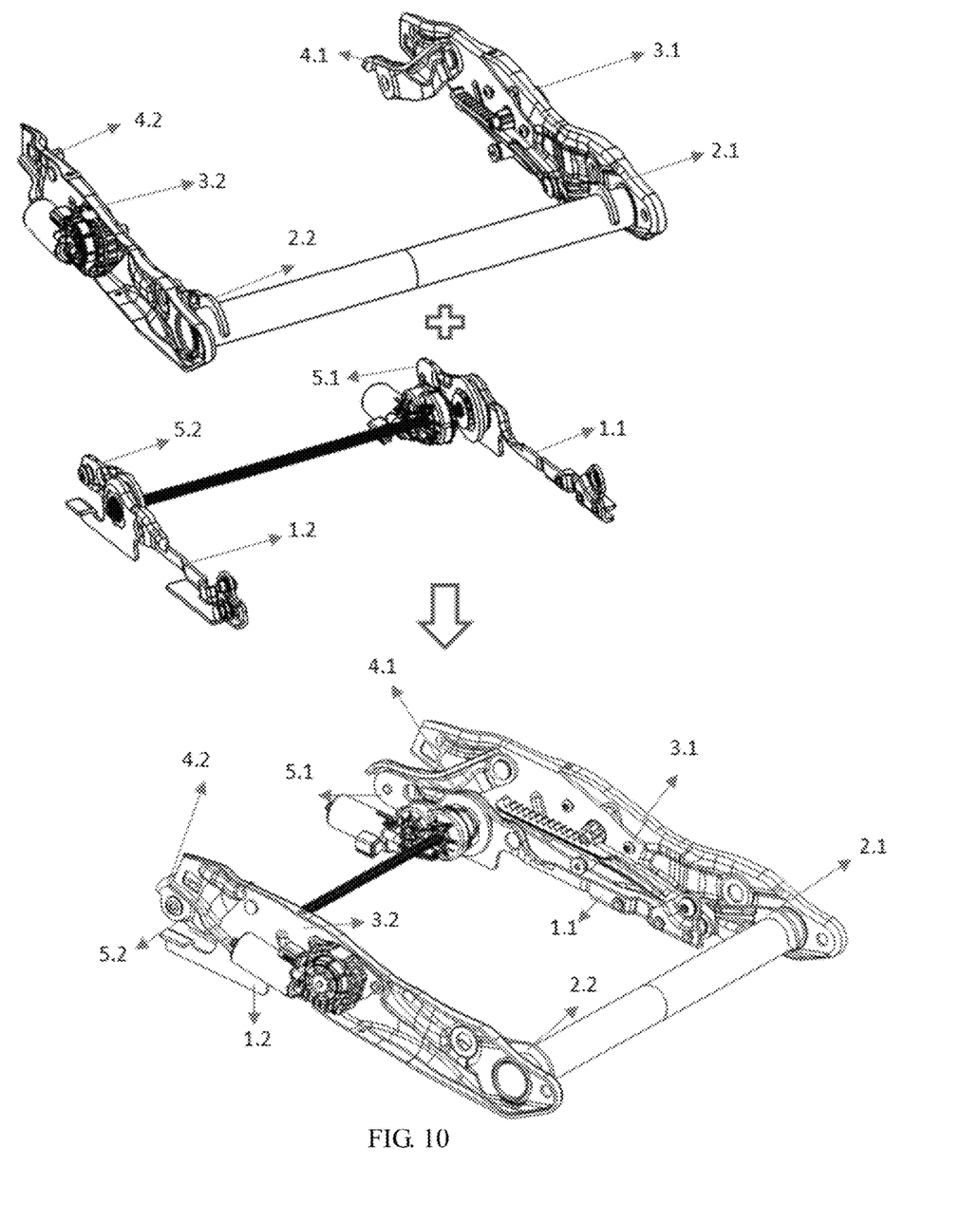
FIG. 10 shows an assembly between an outer front link and an inner front link of the seat five-link structure of FIG. 5.

FIG. 10 shows an assembly between the bottom support, the rear link, the outer front link and the inner front link of the seat five-link structure A. With reference to FIG. 10, the right rear link 2.1 is rotatably mounted to a rear end of the right bottom support 1.1 through a rivet 11, and the left rear link 2.2 is rotatably mounted to a rear end of the left bottom support 1.2 through another rivet 11, so that the two rivets 11 jointly define the above-mentioned second pivot axis $O_2$. The right outer front link 4.1 is rotatably mounted to a front end of the right inner front link 5.1 through a rivet 11, and the left outer front link 4.2 is rotatably mounted to a front end of the left inner front link 5.2 through another rivet 11, so that the two rivets 11 jointly define the pivotal connections of the outer front links and the inner front links.

Figure 11:
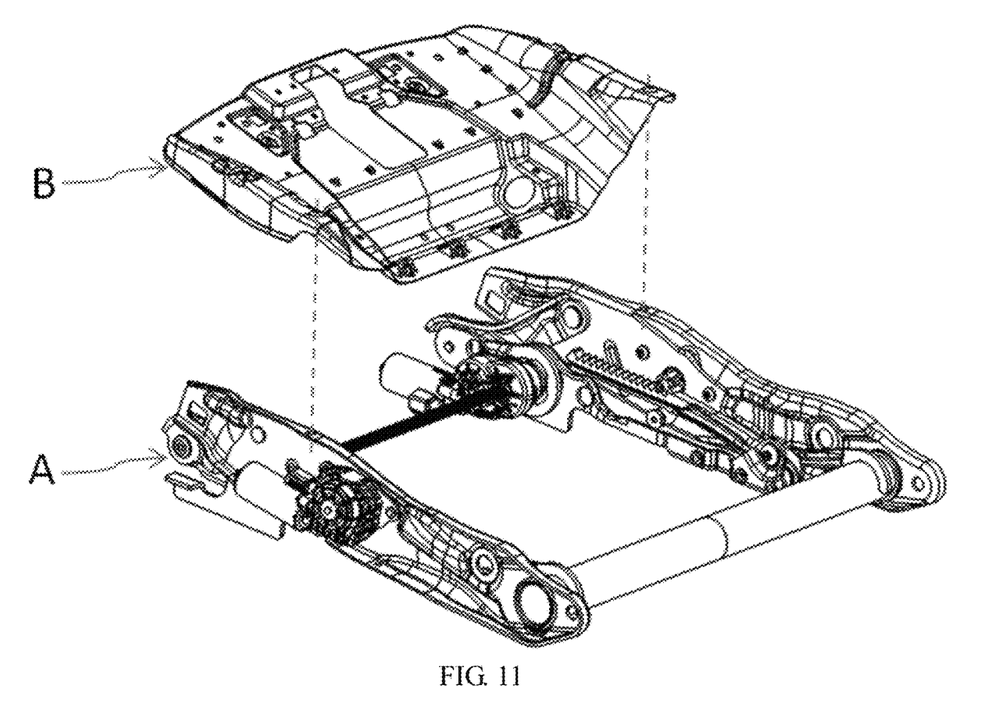
FIG. 11 shows an assembly between the seat five-link structure of FIG. 5 and a seat aggregate.

FIG. 11 shows an assembly between the seat five-link structure A and a seat aggregate, wherein the seat five-link structure A and a seat pan B are fixedly connected by screws, so that a position of a seat cushion on the seat pan B is adjustable through the seat five-link structure A, in order to meet various position requirements.

Figure 12:
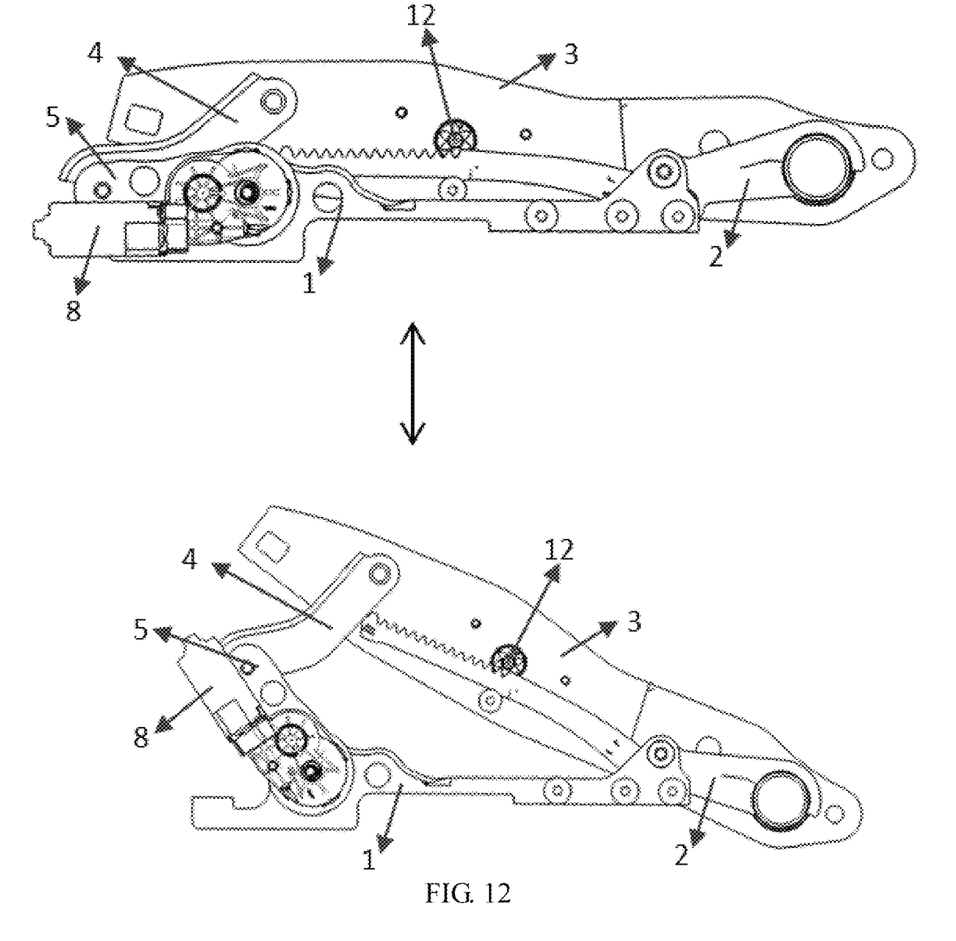
FIG. 12 shows a movement of the seat five-link structure of FIGS. 1A-1C from an initial position to a front lifting position and corresponds to FIG. 2.

FIG. 12 shows a movement of the seat five-link structure A from an initial position to a front lifting position and corresponds to FIG. 2. In the initial position, the first electric motor 8 and the second electric motor 12 don't operate. In the front lifting position, the first electric motor 8 is adjusted to a maximum opening position, wherein the second electric motor 12 keeps inactive, and the seat cushion is lifted to a working position where the seat cushion has an angle of 22.5°. The practice indicates, the length of the inner front link 5 is within the range of 80±10 mm, wherein the strength performance and the adjustment range of the seat five-link structure A are perfect. In particular, the first electric motor 8 may have a differential gear transmission and a worm gear transmission, which may achieve a self-locking function.

Figure 13:
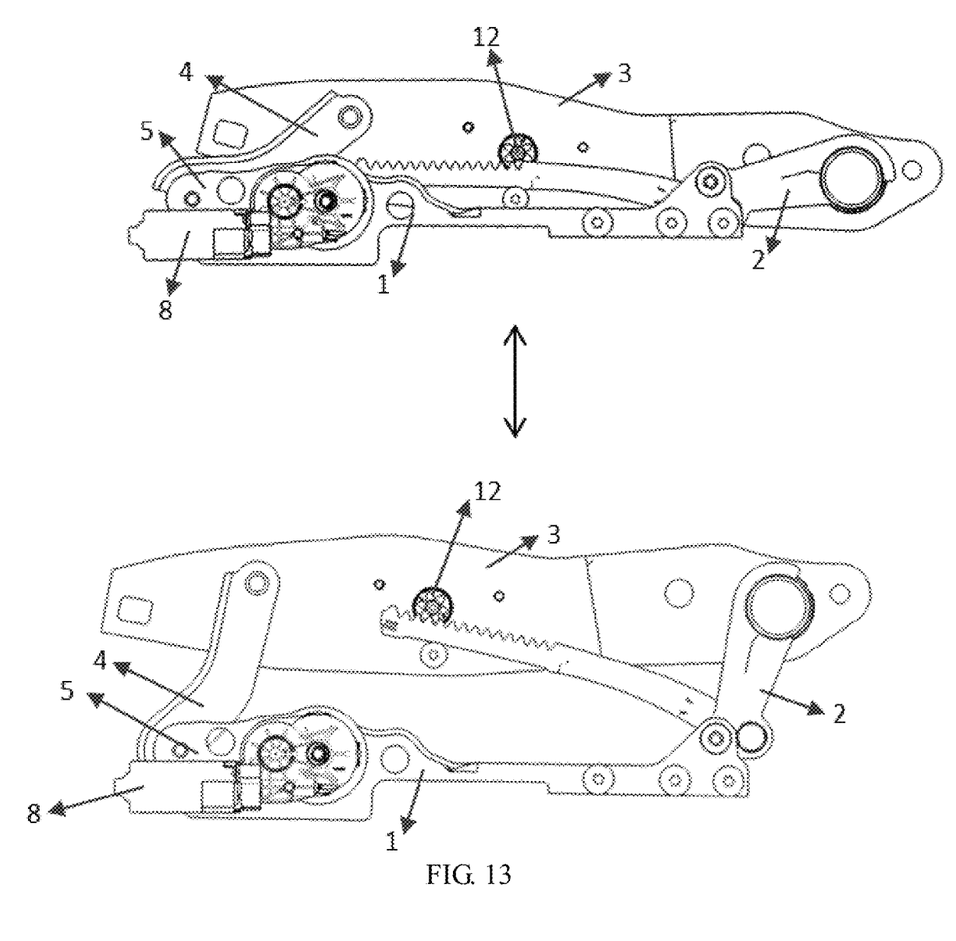
FIG. 13 shows a movement of the seat five-link structure of FIGS. 1A-1C from an initial position to a rear lifting position and corresponds to FIG. 3.

FIG. 13 shows a movement of the seat five-link structure A from an initial position to a rear lifting position and corresponds to FIG. 3. In the initial position, the first electric motor 8 and the second electric motors 12 don't operate. In the rear lifting position, the second electric motors 12 are adjusted to a maximum opening position, wherein the first electric motor 8 keeps inactive, and the seat cushion is lifted to a rest position where the seat cushion has an unchanged angle and the height of the seat cushion is increased by 100 mm. In particular, the second electric motors 12 may respectively comprise a rack and a gear box, which may achieve a self-locking function.

Figure 14:
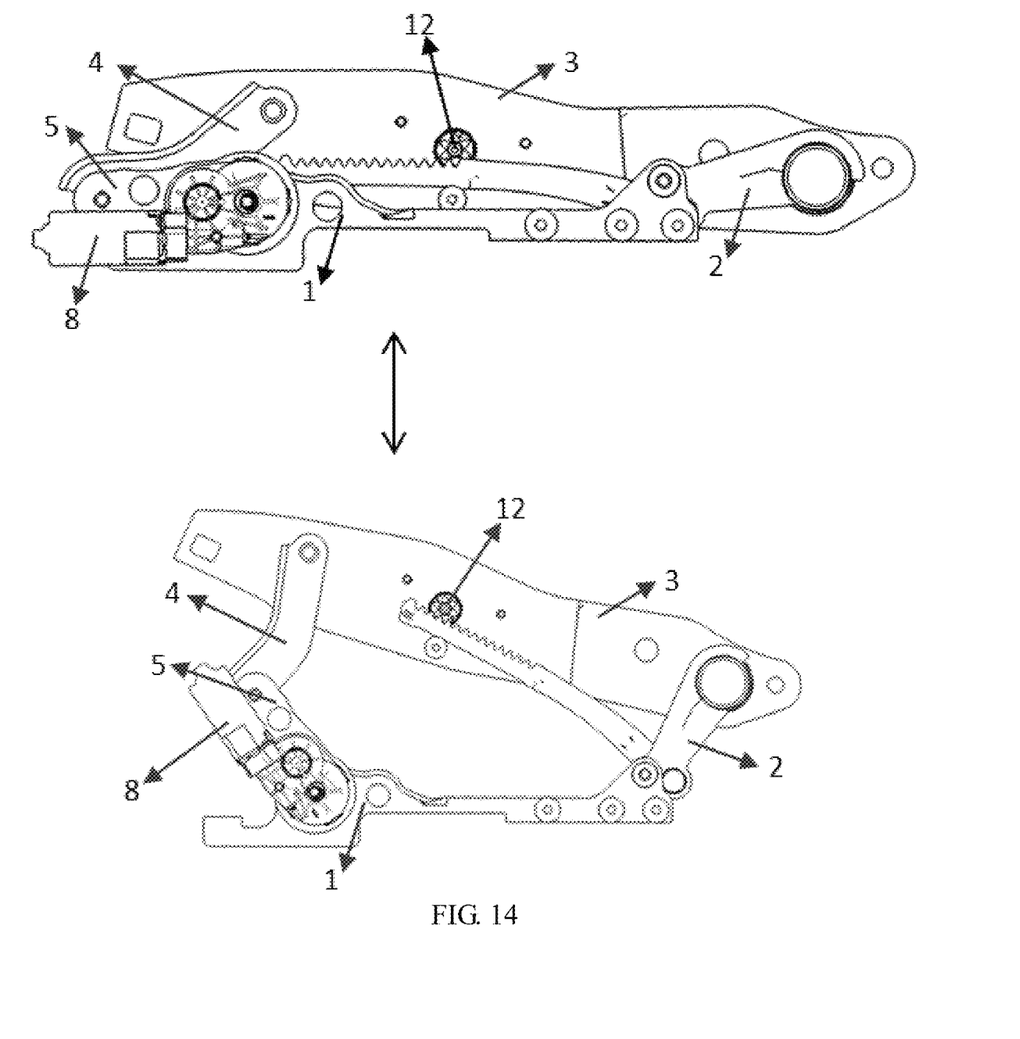
FIG. 14 shows a movement of the seat five-link structure of FIGS. 1A-1C from an initial position to a front and rear lifting position and corresponds to FIG. 4.

FIG. 14 shows a movement of the seat five-link structure A from an initial position to a front and rear lifting position. In the initial position, the first electric motor 8 and the second electric motors 12 don't operate. In the front and rear lifting position, the first electric motor 8 and the second electric motors 12 are adjusted to their maximum opening positions, and they can drive simultaneously, wherein the seat cushion is lifted to a zero-gravity rest position where the angle of the seat cushion is adjusted to 22.5° and the height of the seat cushion is increased by 100 mm, so that the knees and the heart of the occupant reach the same level, and hence the occupant may have a comfortable and relaxed zero-gravity state.

Preferable embodiments of the present invention described above aren't intended to limit the scope of the present invention. Various modifications may be made to the above-mentioned embodiments of the present invention. All of the simple modifications and equivalents on the basis of the disclosure in the claims and in the description of the present patent application fall into the protection scope of the claims of the present patent application. Conventional technical means may be not described in detail.

The invention claimed is:

1. A seat five-link structure, comprising:
    a bottom support, a wall plate, a first front link, a second front link and a rear link, wherein the bottom support is pivotally connected with the first front link through a first pivot axis, the first front link is pivotally connected with the second front link, the second front link is pivotally connected with the wall plate, and the rear link is pivotally connected with the bottom support through a second pivot axis and is pivotally connected with the wall plate;
    a first electric motor configured to output a first external force for driving the first front link to rotate around the first pivot axis;
    a second electric motor configured to output a second external force for driving the rear link to rotate around the second pivot axis; and
    an angle adjuster and a star-shaped rod, wherein the first front link is rotatably mounted to the bottom support through the angle adjuster, wherein the star-shaped rod extends through and cooperates with the angle adjuster, wherein the star-shaped rod is drivable by the first electric motor, wherein an axis of the star-shaped rod defines the first pivot axis.

2. The seat five-link structure as recited in claim 1, wherein a front end of the bottom support is pivotally connected with a first end of the first front link, a second end of the first front link is pivotally connected with a first end of the second front link, a second end of the second front link is pivotally connected with a front end of the wall plate, a rear end of the bottom support is pivotally connected with a first end of the rear link, and a second end of the rear link is pivotally connected with a rear end of the wall plate.

3. The seat five-link structure as recited in claim 1, wherein the first front link is an inner front link, and the second front link is an outer front link.

4. The seat five-link structure as recited in claim 1, wherein the seat five-link structure has an initial position, from which the first front link is rotatable around the first pivot axis in a first direction under the action of the first external force to lift a front side of the seat five-link structure, and the rear link is rotatable around the second pivot axis in a second direction opposite to the first direction under the action of the second external force to lift a rear side of the seat five-link structure.

5. The seat five-link structure as recited in claim 1, wherein the seat five-link structure further comprises a rack, wherein the second electric motor can drive the rear link through the rack.

6. The seat five-link structure as recited in claim 1, wherein the seat five-link structure further comprises a rear pipe fixed to the rear link, wherein a pivotal connection between the rear link and the wall plate is defined by the rear pipe, wherein the wall plate is rotatably mounted to the rear pipe.

7. The seat five-link structure as recited in claim 1, wherein the second pivot axis, a pivotal connection between the second front link and the wall plate, and a pivotal connection between the first front link and the second front link are defined by respective rivets.

8. The seat five-link structure as recited in claim 1, wherein a left structural group comprises the bottom support being a left bottom support, the wall plate being a left wall plate, the first front link being a left first front link, the second front link being a left second front link and the rear link being a left rear link, and the seat five-link structure further comprises a right structural group spaced apart from the left structural group, the right structural group comprising a right bottom support, a right wall plate, a right first front link, a right second front link and a right rear link.

9. The seat five-link structure as recited in claim 8, wherein the angle adjuster is a left angle adjuster and the seat five-link structure further comprises a right angle adjuster wherein the right first front link is rotatably mounted to the right bottom support through the right angle adjuster, wherein the star-shaped rod also extends through and cooperates with the right angle adjuster.

10. The seat five-link structure as recited in claim 8, wherein the angle adjuster is a left angle adjuster for the left structural group.

11. The seat five-link structure as recited in claim 8, wherein
    the second electric motor is a left second electric motor, which is fixedly mounted to the left wall plate, and the seat five-link structure comprises:
- a left rack, which engages a pinion of the left second electric motor and is pivotally connected with the left rear link, and
- a left rack bushing, which is mounted to the left wall plate and supports the left rack; and
- a right second electric motor, which is fixedly mounted to the right wall plate,
- a right rack, which engages a pinion of the right second electric motor and is pivotally connected with the right rear link, and
- a right rack bushing, which is mounted to the right wall plate and supports the right rack, wherein the left rear link and the right rear link are fixed to a rear pipe, and a pivotal connection between the left rear link and the left wall plate and a pivotal connection between the right rear link and the right wall plate are defined by the rear pipe, wherein the left wall plate and the right wall plate are rotatably mounted to the rear pipe.

12. The seat five-link structure as recited in claim 1, wherein the seat five-link structure has an initial position, wherein,
- starting from the initial position, in the case where the first electric motor operates and the second electric motor doesn't operate, the first front link is rotatable around the first pivot axis in a first direction under the action of the first external force, so as to lift a front side of the seat five-link structure and thus adjust an inclination angle of the wall plate, and
- starting from the initial position, in the case where the first electric motor doesn't operate and the second electric motor operates, the rear link is rotatable around the second pivot axis in a second direction opposite to the first direction under the action of the second external force, so as to lift a rear side of the seat five-link structure, wherein the wall plate is lifted up and an inclination angle of the wall plate keeps unchanged.

13. The seat five-link structure as recited in claim 1, wherein a right structural group comprises the bottom support being a right bottom support, the wall plate being a right wall plate, the first front link being a right first front link, the second front link being a right second front link and the rear link being a right rear link, and the seat five-link structure further comprises a left structural group spaced apart from the right structural group, the left structural group comprising a left bottom support, a left wall plate, a left first front link, a left second front link and a left rear link, and wherein the angle adjuster is a right angle adjuster for the right structural group.

14. A seat five-link structure, comprising:
- a bottom support, a wall plate, a first front link, a second front link and a rear link, wherein the bottom support is pivotally connected with the first front link through a first pivot axis, the first front link is pivotally connected with the second front link, the second front link is pivotally connected with the wall plate, and the rear link is pivotally connected with the bottom support through a second pivot axis and is pivotally connected with the wall plate;
- a first electric motor configured to output a first external force for driving the first front link to rotate around the first pivot axis; and
- a second electric motor configured to output a second external force for driving the rear link to rotate around the second pivot axis; and
- wherein the seat five-link structure further comprises a rack, wherein the second electric motor can drive the rear link through the rack; and the rack is pivotally connected with the rear link.

15. The seat five-link structure as recited in claim 14, wherein the second electric motor is fixedly mounted to the wall plate and engages the rack through its pinion.

16. The seat five-link structure as recited in claim 15, wherein the rack is supported by a rack bushing mounted to the wall plate at a side opposite to the pinion.

17. The seat five-link structure as recited in claim 14, wherein the seat five-link structure has an initial position, in which the rack extends substantially in an extension direction of the wall plate.

* * * * *